United States Patent
Kennedy et al.

(10) Patent No.: US 11,565,210 B2
(45) Date of Patent: Jan. 31, 2023

(54) METHOD OF CLEANING AN AIR INLET SCREEN OF A WORK VEHICLE

(71) Applicant: Deere & Company, Moline, IL (US)

(72) Inventors: Thomas L. Kennedy, Dubuque, IA (US); Steven R. Sass, Dubuque, IA (US); Sean P. West, Dubuque, IA (US); Aaron J. Whalen, Cuba City, WI (US)

(73) Assignee: Deere & Company, Moline, IL (US)

( * ) Notice: Subject to any disclaimer, the term of this patent is extended or adjusted under 35 U.S.C. 154(b) by 534 days.

(21) Appl. No.: 15/795,936

(22) Filed: Oct. 27, 2017

(65) Prior Publication Data
US 2019/0126184 A1 May 2, 2019

(51) Int. Cl.
| | |
|---|---|
| *B01D 46/00* | (2022.01) |
| *B01D 46/71* | (2022.01) |
| *B01D 46/70* | (2022.01) |
| *E02F 9/08* | (2006.01) |
| *B60S 1/66* | (2006.01) |
| *B60K 11/06* | (2006.01) |

(52) U.S. Cl.
CPC ............. *B01D 46/71* (2022.01); *B01D 46/70* (2022.01); *B01D 2279/60* (2013.01); *B60K 11/06* (2013.01); *B60S 1/66* (2013.01); *E02F 9/0866* (2013.01)

(58) Field of Classification Search
CPC .............. B01D 29/66–74; B01D 46/00; B01D 46/0067–0071; B01D 2279/60; B01D 46/71; B01D 46/70; B60S 1/66; E02F 9/0866; B60K 11/00–085

USPC .......................... 55/282–305, 484; 123/198 e
See application file for complete search history.

(56) References Cited

U.S. PATENT DOCUMENTS

| | | | |
|---|---|---|---|
| 2008/0136357 A1* | 6/2008 | Beck | F01P 11/12 318/280 |
| 2013/0153180 A1* | 6/2013 | Montocchio | B60K 11/04 165/121 |

FOREIGN PATENT DOCUMENTS

| | | |
|---|---|---|
| CN | 201548015 | 8/2010 |
| CN | 205977375 | 2/2017 |
| KR | 10-2012-0085619 | 8/2012 |
| RU | 2469374 | 12/2012 |

* cited by examiner

*Primary Examiner* — T. Bennett Mckenzie
(74) *Attorney, Agent, or Firm* — Michael Best & Friedrich LLP (57) ABSTRACT

A method of removing debris from a screen cover has a first mode of operation which includes: activating first and second fans to move first and second portions of air through screen cover and into a plenum, and moving the first and second portions of air from the plenum into a heat exchanger. A second mode of operation includes: deactivating the first fan for a first time period, activating the second fan for the first time period to move a third portion of air into the plenum, moving a first part of the third portion of air from the plenum into the heat exchanger during the first time period, and moving a second part of the third portion of air from the plenum through the screen cover during the first time period such that the second part of the third portion of air removes debris from the screen cover.

17 Claims, 7 Drawing Sheets

METHOD OF CLEANING AN AIR INLET SCREEN OF A WORK VEHICLE

BACKGROUND

The present disclosure relates to a method of cleaning at least one screen of a work vehicle, especially a work vehicle in a high debris environment.

SUMMARY

In one embodiment, the disclosure includes a method of removing debris from a screen cover. The method includes a first mode of operation and a second mode of operation. The first mode of operation includes the following steps: activating a first fan to move a first portion of air through the screen cover and into a plenum in a first direction, activating a second fan to move a second portion of air into the plenum, and moving the first portion of air and the second portion of air from the plenum into a heat exchanger. The second mode of operation includes the following steps: deactivating the first fan for a first time period, activating the second fan for the first time period to move a third portion of air into the plenum, moving a first part of the third portion of air from the plenum and into the heat exchanger during the first time period, and moving a second part of the third portion of air from the plenum and through the screen cover in a second direction during the first time period such that the second part of the third portion of air removes debris from the screen cover.

In another embodiment the disclosure includes a method of cleaning first and second screens of a work vehicle in which the work vehicle including a cab, a prime mover and a heat exchanger. The method includes a first mode of operation and a second mode of operation. The first mode of operation includes the following steps: activating a first fan to move a first portion of air through the first screen and into a plenum, activating a second fan to move a second portion of air through the second screen and into the plenum, moving the first portion of air and the second portion of air from the plenum and through a heat exchanger, heating the first portion of air and the second portion of air with the heat exchanger, and moving the heated first portion of air and the second portion of air into the prime mover. The second mode of operation includes the following steps: deactivating the first fan for a first time period, activating the second fan for the first time period to move a third portion of air into the plenum, moving a first part of the third portion of air from the plenum through the heat exchanger during the first time period, moving a second part of the third portion of air from the plenum through the first screen during the first time period, and removing debris from the first screen with the second part of the third portion of air.

Some embodiments of the disclosure include a control system for cleaning an intake screen of a work vehicle. The work vehicle includes a plenum having an outlet positioned between a first inlet in alignment with a second inlet, a first fan positioned at the first inlet, and a second fan positioned at the second inlet and facing the first fan. The control system includes a memory and a processor configured to generate a first operating signal to activate the first fan, and configured to generate a second operating signal to activate the second fan. The processor is also configured to receive a first field signal indicative of a condition of a first screen aligned with the first fan, and is configured to determine whether the first screen requires cleaning based at least in part on the first field signal. If the first screen requires cleaning based at least in part on the first field signal, the processor is configured to generate a third operating signal to deactivate the first fan such that the first fan is deactivated while the second fan in activated, and thereafter, the processor is configured to receive a second field signal different that the first field signal, the second field signal indicative of a condition of the first screen. The processor is further configured to determine whether the first screen requires cleaning based at least in part on the second field signal. If the first screen does not require cleaning based at least in part on the second field signal, the processor is configured to generate a fourth operating signal to activate the first fan such that the first fan is activated while the second fan is activated.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways.

Figure 1:
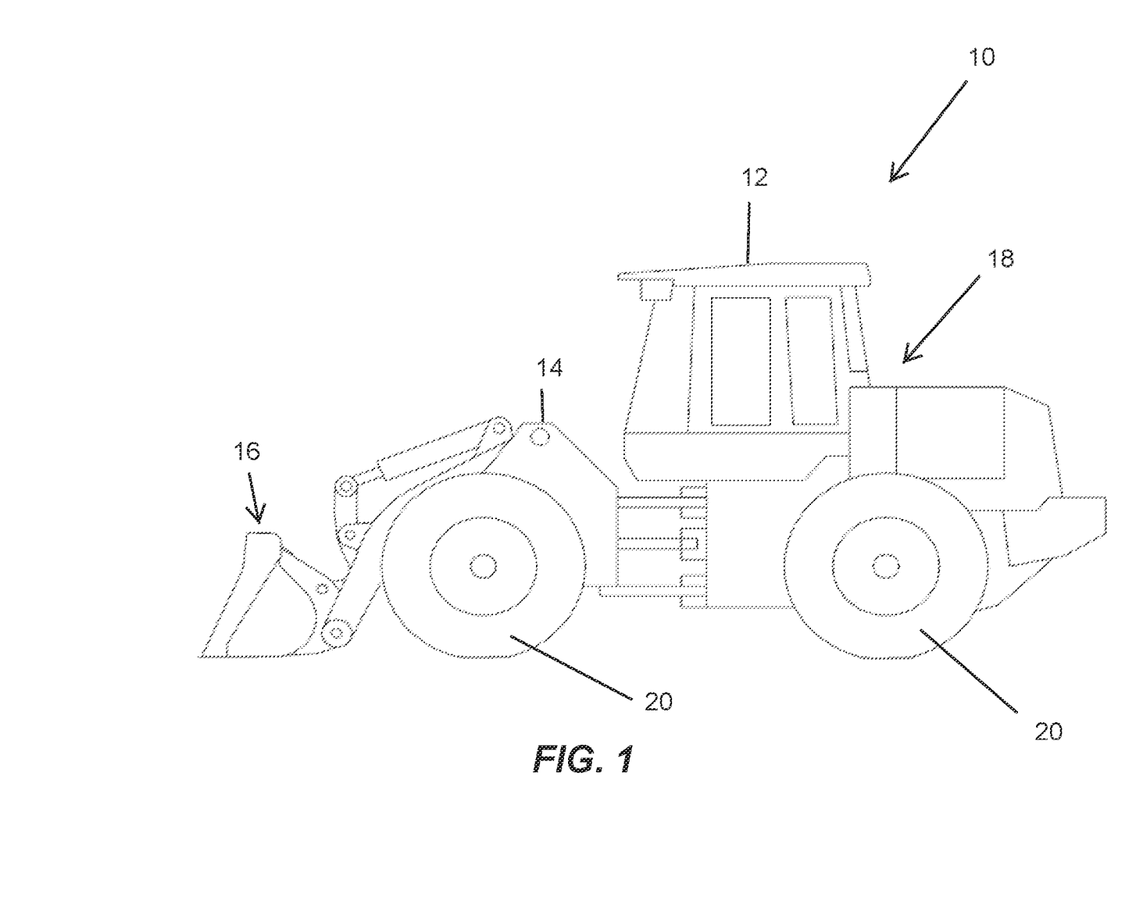
FIG. 1 is a side view of a four wheel drive loader according to some embodiments.

FIG. 1 illustrates a four wheel drive loader 10 according to some embodiments. The illustrated four wheel drive loader 10 includes a cab 12, an articulation joint 14, a bucket 16, a prime mover 18 and a plurality of wheels 20. The illustrated four wheel drive loader 10 is one possible type of work vehicle that can be utilized with the present disclosure. Other work vehicles can be utilized in place of the illustrated four wheel drive loader, including those for use in high debris environments.

Figure 2:
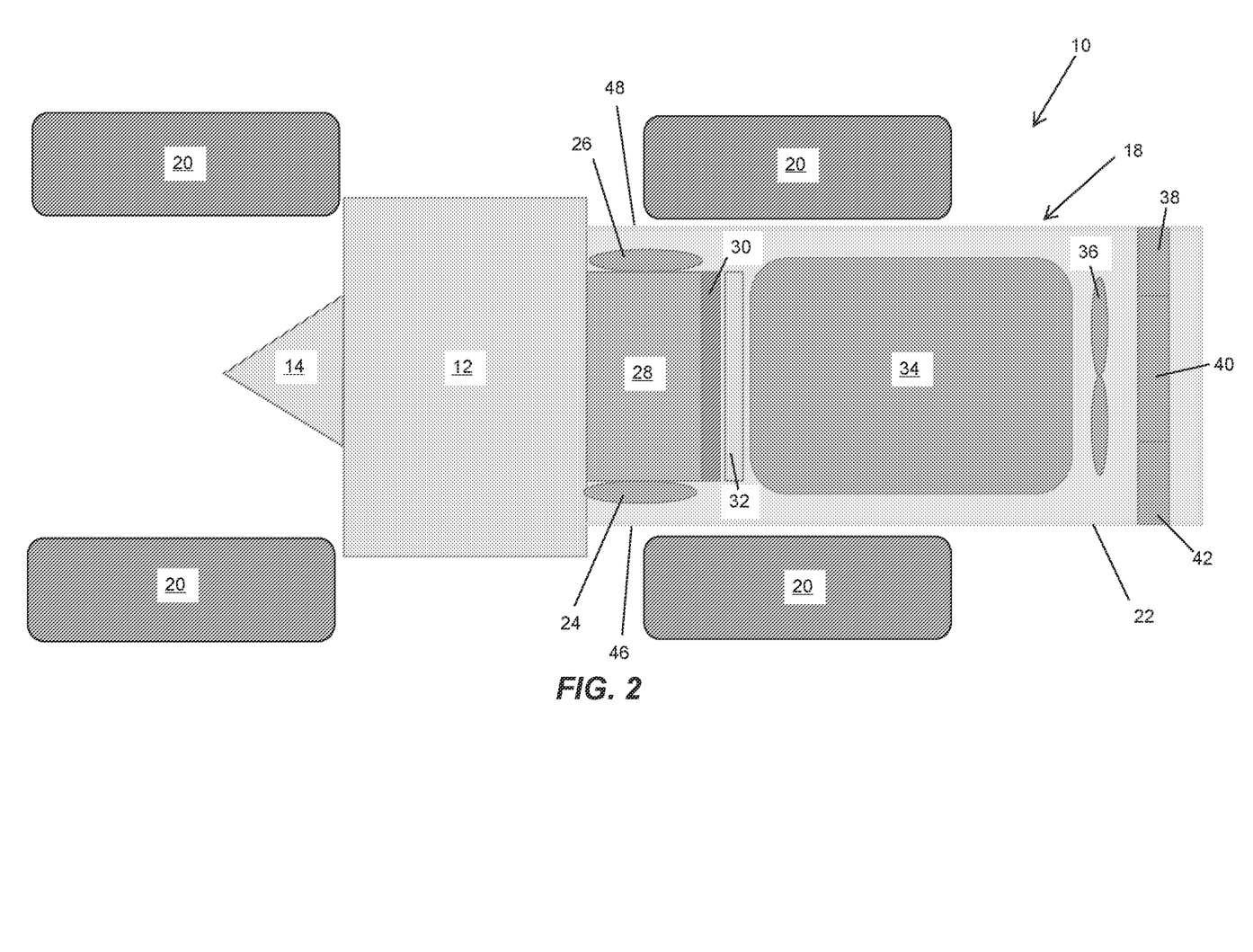
FIG. 2 is a top schematic view of the four wheel drive loader of FIG. 1.

FIG. 2 is a schematic top view of the four wheel drive loader 10 and shows the relative position of the cab 12, the articulation joint 14, the prime mover 18 and the wheels 20. The bucket 16 and loader frame are removed from FIG. 2 for clarity. The illustrated prime mover 18 includes a casing 22, a first fan 24, a second fan 26, a plenum 28, a first heat exchanger 30, a second heat exchanger 32, an engine 34, a third fan 36, a charge air cooler 38, a radiator 40, and a transmission oil cooler 42. Other configurations of the components of the prime mover 18 are possible and are considered within the scope of the disclosure.

The illustrated casing 22 includes a first screen 46 and a second screen 48. The first screen 46 is substantially aligned with the first fan 24 and the second screen 48 is substantially aligned with the second fan 26. The first and second screens 46 and 48 are operable to block large debris, such as leaves and grass, from entering the first and second fans 24 and 26, respectively. The first and second screens 46 and 48 can be formed by a plurality of small apertures directly in the casing 22 or by first and second large apertures in the casing 22 to which a respective screen is affixed. The first and second screens 46 and 48 inhibit large debris from entering the first and second fans 24 and 26, and as a result, from entering the plenum 28 and the first and second heat exchangers 30 and 32. The screen gauge of the first and second screens 46 and 48 can be selected by a user to inhibit entry of large debris while permitting an acceptable flow rate of air for the work vehicle 10 and the specific environment in which the work vehicle will operate.

Figure 3:
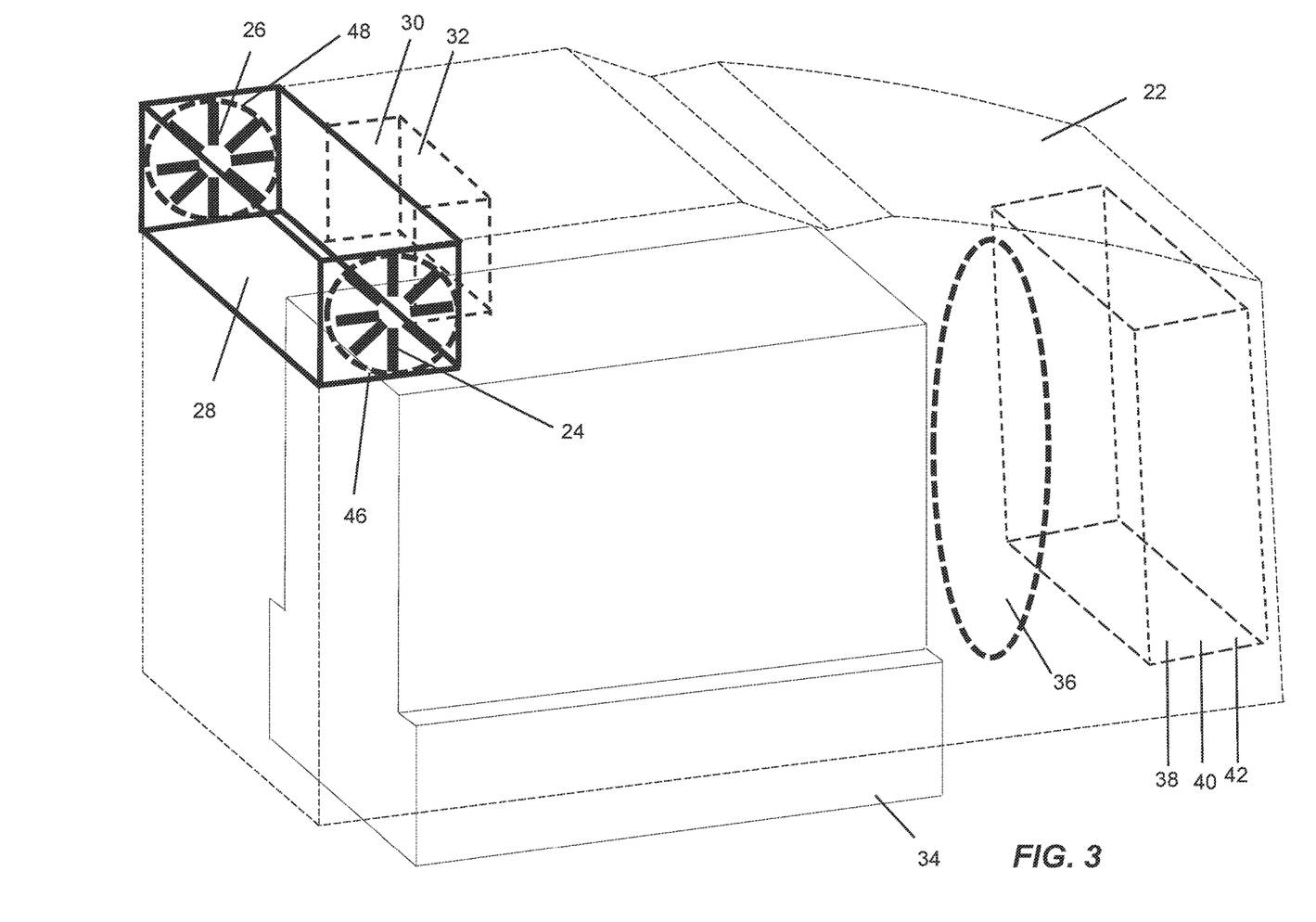
FIG. 3 is a perspective schematic view of the some of the components of the four wheel drive loader of FIGS. 1 and 2.

FIG. 3 illustrates the casing 22 with the first and second screens 46 and 48 and the relative position of various components in some embodiments. In the illustrated embodiment, the first and second fans 24 and 26, the plenum 28, and the first and second heat exchangers 30 and 32 are positioned above and in front of the engine 34 (e.g., between the cab 12 and the engine 34). Air flowing through the first and second heat exchangers 30 and 32 is directed across the engine 34 with one or more conduits or flow diverters (not specifically shown in FIG. 3). The third fan 36 moves air from the engine 34 and across the charge air cooler 38, the radiator 40 and the transmission oil cooler 42.

Figure 4:
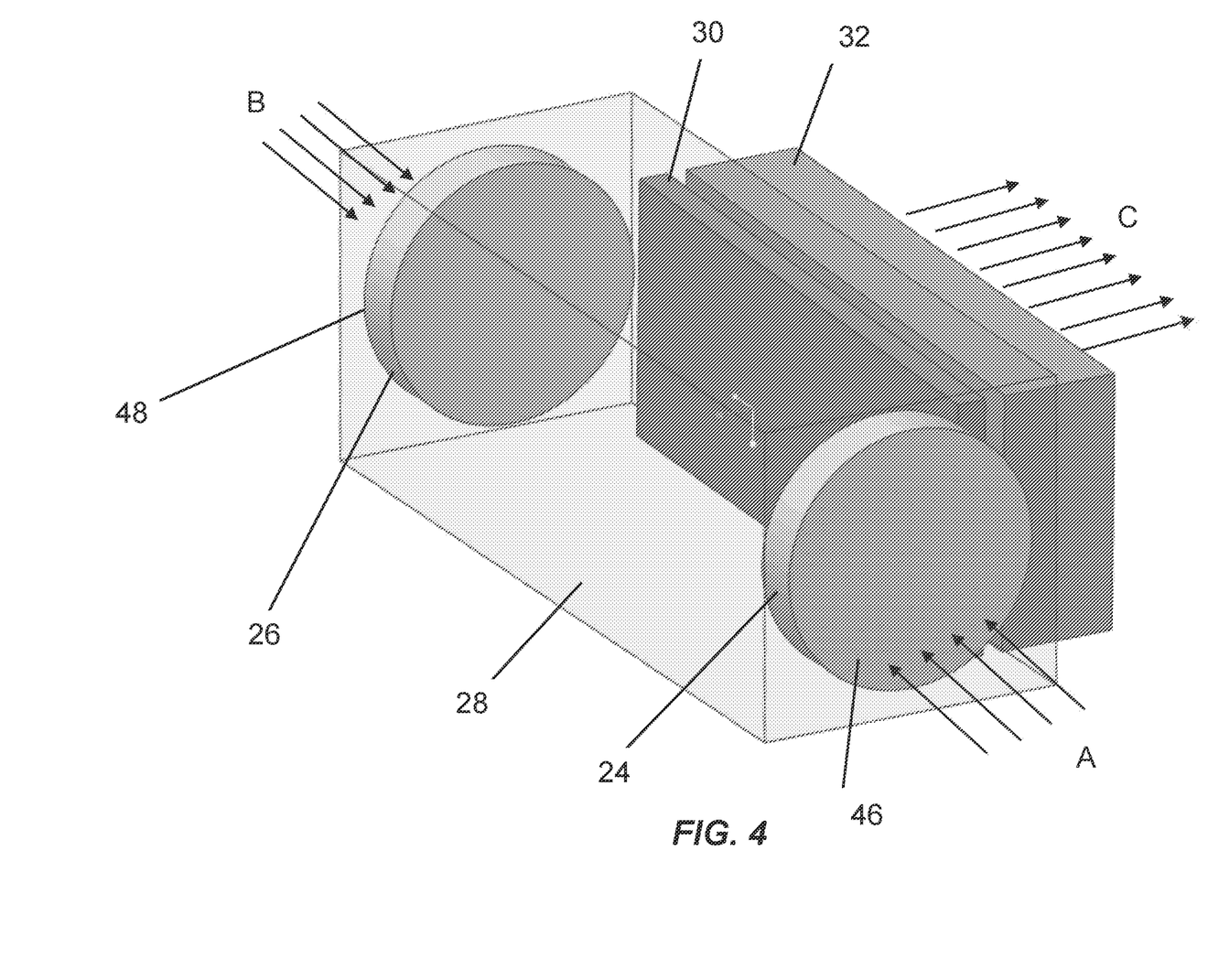
FIG. 4 is a perspective schematic view of an air moving assembly in a first mode of operation.

FIG. 4 illustrates a first operating mode in which the first fan 24 draws ambient air through the first screen 46 and into the plenum 28 along arrows A, and the second fan 26 draws ambient air through the second screen 48 and into the plenum 28 along arrows B. Air flows from the plenum 28 through the first and second heat exchangers 30 and 32 before flowing toward the engine 34 along arrows C. During normal operation, both of the first and second fans 24 and 26 draw air into the plenum 28 and direct all the air from the plenum 28 through the first and second heat exchangers 30 and 32. In FIG. 4, the quantity of air represented by arrows A plus the quantity of air represented by arrows B flows through the first and second heat exchangers 30 and 32 along arrows C (e.g., A+B=C).

After a period of time, as determined by the operator and/or a program in the vehicle control system, the first screen 46 and the second screen 48 are cleaned. This process is described below and is illustrated in FIGS. 5-7.

Figure 5:
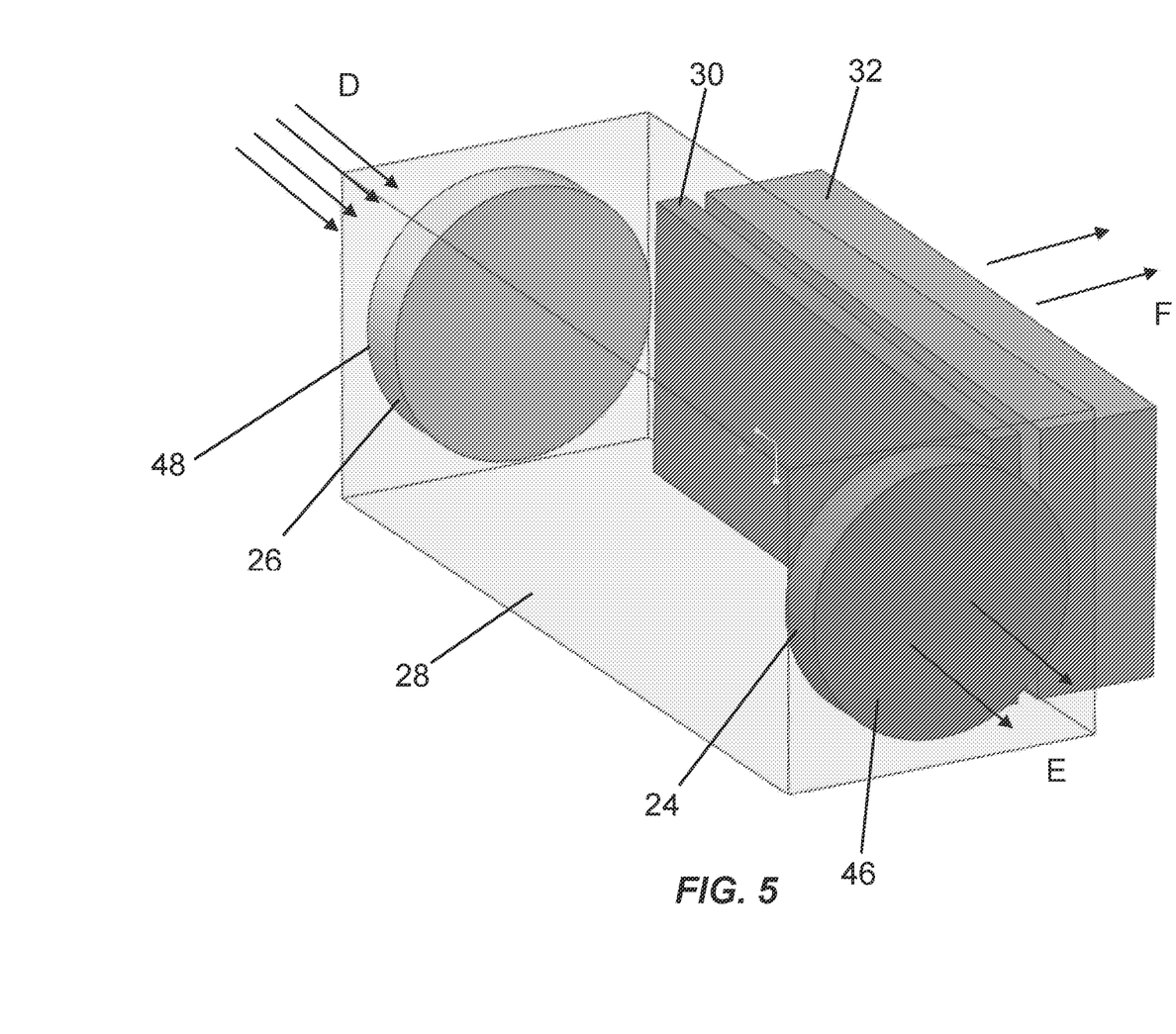
FIG. 5 is a perspective schematic view of an air moving assembly in a second mode of operation.

FIG. 5 illustrates a second operating mode in which the first screen 46 is cleaned by deactivating the first fan 24 for a set time period while the second fan 26 operates. The second fan 26 moves air into the plenum 28 along arrows D. Air flows out of the first fan 24 and the first screen 46 along arrows E as well as flowing out through the first and second heat exchangers 30 and 32 along arrows F. The airflow along arrows E removes debris, such as leaves and grass, from the first screen 46. Air is still provided to the first and second heat exchangers 30 and 32, but the quantity of air is temporarily less than when both the first and second fans 24 and 26 are operating. In FIG. 5, the quantity of air along arrows D minus the quantity of air along arrows E equals the quantity of air flowing into the first and second heat exchangers 30 and 32 along arrows F, (e.g., D−E=F).

Figure 6:
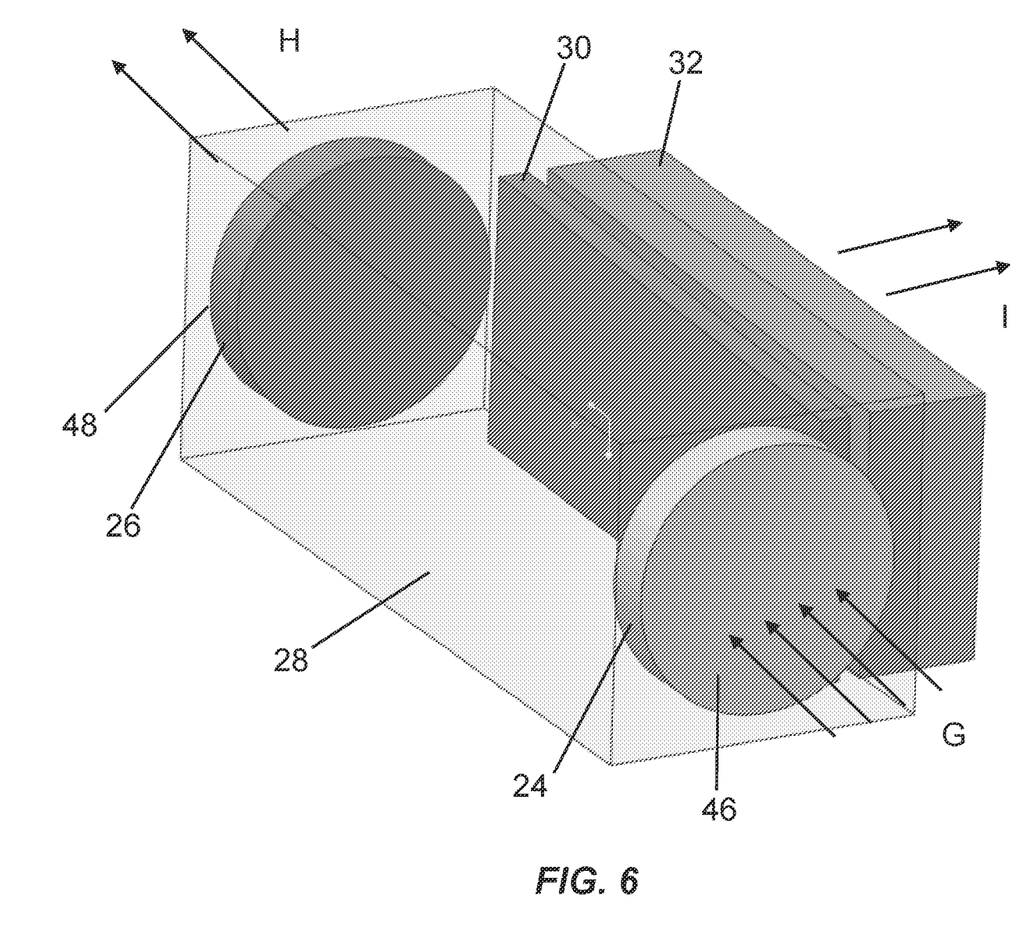
FIG. 6 is a perspective schematic view of an air moving assembly in a third mode of operation.
Figure 7:
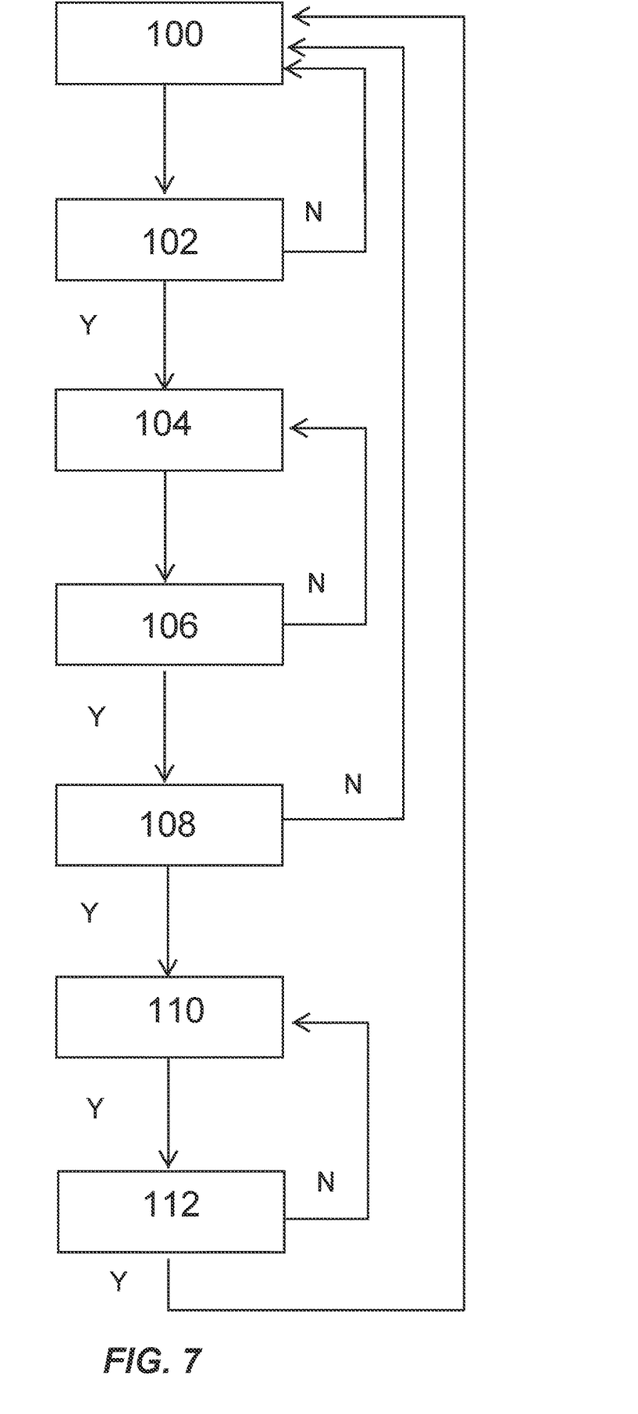
FIG. 7 is a flow chart indicating a method of operation according to some embodiments.

FIG. 6 illustrates a third operating mode in which the second screen 48 is cleaned by deactivating the second fan 26 for a set time period while the first fan operates 24. The first fan 24 moves air into the plenum 28 along arrows G. Air flows out of the second fan 26 and the second screen 48 along arrows H as well as flowing out through the first and second heat exchangers 30 and 32 along arrows I. The airflow along arrows H removes debris, such as leaves and grass, from the second screen 48. Air is still provided to the first and second heat exchangers 30 and 32, but the quantity of air is temporarily less than when both the first and second fans 24 and 26 are operating. In FIG. 6, the quantity of air along arrows G minus the quantity of air along arrows H equals the quantity of air into the first and second heat exchangers 30 and 32 along arrows I, (e.g., G−H=I).

The operator and/or the vehicle control system can determine when the cleaning process occurs and can determine the length of the set time periods. In some embodiments, the vehicle control system cleans the first and second screens 46 and 48 at pre-set time intervals for a pre-set duration. In some embodiments, a pressure drop across the cooler, plenum, and/or fan to indicate the restriction of the components detected. Cleaning of the first and second screens 46 and 48 is initiated when the measured pressure drop across the cooler, plenum, and/or fan pressure is outside an acceptable range. In some embodiments, cleaning of the first and second screens 46 and 48 is initiated by an operator (e.g., upon visual inspection of the first and second screens 46 and 48). In some embodiments, cleaning of the first and second screens 46 and 48 can be initiated by any or all of these scenarios.

FIG. 7 is a flow chart showing one possible sequence of operations according to some embodiments. At step 100, the first and second fans 24 and 26 are both operating and the system is in the first operating mode (shown in FIG. 4). At step 102, the control system determines if the first screen 46 should be cleaned based upon one or more factors, such as an elapsed time, a volume flow rate of air through the heat exchangers, a temperature of the engine, etc. If the first screen 46 is adequately clean, operation returns to step 100 in which the first and second fans 24 and 26 are both operating. At step 102, if the first screen 46 needs to be cleaned, the operation moves to step 104 at which the first fan 24 is deactivated and the system operates in the second operating mode (shown in FIG. 5). At step 106, the control system determines if sufficient cleaning of the first screen 46 has occurred. Sufficient cleaning can be measured by an elapsed time period, a volume flow rate of air through the heat exchangers, a temperature of the engine, etc. If sufficient cleaning of the first screen 46 has occurred, the operation moves to step 108. If sufficient cleaning of the first screen 46 has not yet occurred, the operation returns to step 104.

At step 108, the control system determines if the second screen 48 needs to be cleaned based upon one or more factors, such as an elapsed time, a volume flow rate of air through the heat exchangers, a temperature of the engine, etc. If the second screen 48 is adequately clean, operation returns to step 100 in which the first and second fans 24 and 26 are both operating. At step 108, if the second screen 48 needs to be cleaned, the operation moves to step 110 at which the first fan 24 is activated and the second fan 26 is deactivated and the system operates in the third operating mode (shown in FIG. 6). At step 112, the control system determines if sufficient cleaning of the second screen 48 has occurred. Sufficient cleaning can be measured by an elapsed time period, a volume flow rate of air through the heat exchangers, a temperature of the engine, etc. If sufficient cleaning of the second screen 48 has occurred, the operation returns to step 100. If sufficient cleaning of the second screen 48 has not yet occurred, the operation returns to step 110.

In all three operating modes the plenum 28 at least one of the fans 24 and 26 is operating which maintains a pressure in the plenum above atmospheric pressure. Since the plenum pressure is greater than atmospheric pressure, air always flows from the plenum 28 through the first and second heat exchangers 30 and 32. Air is inhibited from flowing from the engine 34 and back through the second and first heat exchanger 32 and 30 because the plenum pressure is greater than the pressure in the heat exchangers 30 and 32 and the engine 34. Therefore, hot air is not drawn from the engine 34 across the heat exchangers 32 and 30. Such hot air could damage the heat exchangers 30 and 32.

In some embodiments, the first heat exchanger 30 is a condenser for an air conditioning unit and the second heat exchanger is a hydraulic oil cooler. Other heat exchanger combinations and configurations can be utilized with this disclosure.

Various features and advantages of the disclosure are set forth in the following claims.

What is claimed is:

1. A method of removing debris from a screen cover, the method comprising:
    initiating a first mode of operation, the first mode of operation configured to run for a first time period, the first mode of operation including the following steps
        activating a first fan to move a first portion of air through the screen cover and into a plenum in a first direction, such that the first fan is activated for the first time period, and
        activating a second fan to move a second portion of air into the plenum, such that the second fan is activated for the first time period
        whereby the first portion of air and the second portion of air move from the plenum into a heat exchanger;
    thereafter, initiating a second mode of operation, the second mode of operation configured to run for a second time period, the second mode of operation including the following steps
        deactivating the first fan, such that the first fan is deactivated for the second time period, and
        activating the second fan to move a third portion of air into the plenum, such that the second fan is activated for the second time period,
        whereby a first part of the third portion of air moves from the plenum and into the heat exchanger during the second time period and a second part of the third portion of air moves from the plenum and through the screen cover in a second direction during the second time period; and
    thereafter initiating the first mode of operation, wherein the plenum pressure is continuously maintained above atmospheric pressure from the first mode of operation, through the second mode of operation, and to the first mode of operation.

2. The method of claim 1, further comprising inhibiting flow from the heat exchanger into the plenum during the first time period and during the second time period.

3. The method of claim 1, wherein the second direction is opposite the first direction.

4. The method of claim 1, further comprising initiating a third mode of operation, the third mode of operation configured to run for a third time period, the third mode of operation including the following steps
    activating the first fan for the third time period to move a fourth portion of air into the plenum, and
    deactivating the second fan, such that the second fan is deactivated for the third time period,
    whereby a first part of the fourth portion of air moves from the plenum and into the heat exchanger during the third time period and a second part of the fourth portion of air moves from the plenum through a second screen cover in a fourth direction during the third time period, and
    wherein the plenum pressure is continuously maintained above atmospheric pressure through the third mode of operation.

5. The method of claim 4, further comprising inhibiting flow from the heat exchanger into the plenum during the first time period, during the second time period and during the third time period.

6. The method of claim 4, wherein the second direction is opposite the first direction and the fourth direction is opposite the third direction.

7. The method of claim 1, wherein the heat exchanger is a heat exchanger of a work vehicle having a prime mover, and wherein the first mode of operation further includes heating the first portion of air and the second portion of air with the heat exchanger, and moving the heated first portion of air and the second portion of air into the prime mover.

8. The method of claim 7, further comprising maintaining a higher pressure in the plenum than in the heat exchanger during the first time period such that the first part of the third portion of air flows from the plenum and into the heat exchanger during the first time period.

9. The method of claim 8, further comprising heating the first part of the third portion of air with the heat exchanger during the second time period and directing the heated first part of the third portion of air toward the prime mover during the second time period.

10. The method of claim 7, further comprising inhibiting flow from the heat exchanger into the plenum during the second time period.

11. The method of claim 4, further comprising maintaining a higher pressure in the plenum than in the heat exchanger during the third time period such that the first part of the fourth portion of air flows from the plenum and into the heat exchanger during the third time period.

12. The method of claim 11, wherein the heat exchanger is a heat exchanger of a work vehicle having a prime mover, further comprising heating the first part of the fourth portion of air with the heat exchanger during the third time period and moving the heated first part of the fourth portion of air toward the prime mover during the third time period.

13. The method of claim 4, further comprising inhibiting flow from the heat exchanger into the plenum during the second time period and during the third time period.

14. The method of claim 1, wherein activating the first fan to move the first portion of air through the screen cover and into the plenum in the first direction includes rotating the first fan, and
    wherein deactivating the first fan for the second time period includes permitting the first fan to cease rotating for the second time period.

15. The method of claim 4, wherein activating the second fan to move the second portion of air through the screen cover and into the plenum in the second direction includes rotating the second fan, and
    wherein deactivating the second fan for the third time period includes permitting the second fan to cease rotating for the third time period.

16. The method of claim 15, wherein activating the first fan to move the first portion of air through the screen cover and into the plenum in the first direction includes rotating the first fan, and wherein deactivating the first fan for the second time period includes permitting the first fan to cease rotating for the second time period.

17. A control system for cleaning an intake screen of a work vehicle, the work vehicle including a plenum having an outlet positioned between a first inlet in alignment with a second inlet, a first fan disposed at the first inlet, and a second fan disposed at the second inlet and facing the first fan, the control system comprising:

a memory; and a processor configured to generate a first operating signal to activate the first fan, generate a second operating signal to activate the second fan, receive a first field signal indicative of a condition of a first screen aligned with the first fan, determine whether the first screen requires cleaning based at least in part on the first field signal, if the first screen requires cleaning based at least in part on the first field signal, generate a third operating signal to deactivate the first fan such that the first fan is deactivated while the second fan in activated, thereafter, receive a second field signal different that the first field signal, the second field signal indicative of a condition of the first screen, determine whether the first screen requires cleaning based at least in part on the second field signal, if the first screen does not require cleaning based at least in part on the second field signal, generate a fourth operating signal to activate the first fan such that the first fan is activated while the second fan is activated.

* * * * *